(12) United States Patent
Haltiner, Jr. et al.

(10) Patent No.: US 6,630,264 B2
(45) Date of Patent: Oct. 7, 2003

(54) SOLID OXIDE FUEL CELL PROCESS GAS SAMPLING FOR ANALYSIS

(75) Inventors: Karl Jacob Haltiner, Jr., Fairport, NY (US); Harry Richard Mieney, Byron, NY (US)

(73) Assignee: Delphi Technologies, Inc., Troy, MI (US)

( * ) Notice: Subject to any disclaimer, the term of this patent is extended or adjusted under 35 U.S.C. 154(b) by 343 days.

(21) Appl. No.: 09/838,659

(22) Filed: Apr. 19, 2001

(65) Prior Publication Data

US 2001/0049035 A1 Dec. 6, 2001

Related U.S. Application Data

(60) Provisional application No. 60/268,397, filed on Feb. 13, 2001, and provisional application No. 60/201,568, filed on May 1, 2000.

(51) Int. Cl.[7] .................................................. H01M 8/10
(52) U.S. Cl. .......................... 429/32; 429/20; 429/26; 429/34; 429/38; 429/39
(58) Field of Search ............................. 429/26, 34, 38, 429/39, 32, 20

(56) References Cited

U.S. PATENT DOCUMENTS

| | | | | |
|---|---|---|---|---|
| 5,498,487 A | * | 3/1996 | Ruka et al. | 429/20 |
| 6,132,895 A | * | 10/2000 | Pratt et al. | 429/39 |
| 6,387,555 B1 | * | 5/2002 | Wheeler et al. | 429/17 |
| 6,451,466 B1 | * | 9/2002 | Grasso et al. | 429/20 |
| 6,458,477 B1 | * | 10/2002 | Hsu | 429/17 |
| 6,465,118 B1 | * | 10/2002 | Dickman et al. | 429/20 |
| 6,479,177 B1 | * | 11/2002 | Roberts et al. | 429/13 |
| 6,485,852 B1 | * | 11/2002 | Miller et al. | 429/17 |
| 6,541,148 B1 | * | 4/2003 | Walsh et al. | 429/39 |
| 6,562,496 B2 | * | 5/2003 | Faville et al. | 429/13 |
| 6,562,502 B2 | * | 5/2003 | Haltiner, Jr. | 429/25 |

* cited by examiner

*Primary Examiner*—Bruce F. Bell
(74) *Attorney, Agent, or Firm*—Jimmy L. Funke

(57) ABSTRACT

A method for monitoring process gas of a solid oxide fuel cell system is disclosed. The method comprises directing a portion of process gas from a chamber of the solid oxide fuel cell system to a main plenum chamber. A portion of process gas is cooled to a measurable temperature and directed to a sensor for analyzing. A solid oxide fuel cell system is also disclosed.

17 Claims, 1 Drawing Sheet

SOLID OXIDE FUEL CELL PROCESS GAS SAMPLING FOR ANALYSIS

CROSS-REFERENCE TO RELATED APPLICATION

The present application claims the benefit of the date of U.S. Provisional Application No. 60/201,568, filed on May 1, 2000 and an earlier filed provisional application, having U.S. Provisional Application No. 60/268,397, filed on Feb. 13, 2001.

BACKGROUND

Alternative transportation fuels have been represented as enablers to reduce toxic emissions in comparison to those generated by conventional fuels. At the same time, tighter emission standards and significant innovation in catalyst formulations and engine controls has led to dramatic improvements in the low emission performance and robustness of gasoline and diesel engine systems.

One approach to addressing the issue of emissions is the employment of fuel cells, particularly solid oxide fuel cells ("SOFC"), in a transportation vehicle. A fuel cell is an energy conversion device that converts chemical energy into electrical energy. The fuel cell generates electricity and heat by electrochemically combining a gaseous fuel, such as hydrogen, carbon monoxide, or a hydrocarbon, and an oxidant, such as air or oxygen, across an ion-conducting electrolyte. The fuel cell generally consists of two electrodes positioned on opposite sides of an electrolyte. The oxidant passes over the oxygen electrode (cathode) while the fuel passes over the fuel electrode (anode), generating electricity, water, and heat.

A SOFC is constructed entirely of solid-state materials, utilizing an ion conductive oxide ceramic as the electrolyte. The electrochemical cell in a SOFC comprises an anode and a cathode with an electrolyte disposed therebetween.

Application and research efforts during the 20$^{th}$ century into using SOFCs were generally concentrated in the stationary power generation industry. Because of those SOFC designs, the SOFC was not readily adaptable for use in a transportation vehicle. A transportation vehicle application imposes specific temperature, volume, and mass requirements, as well as real world factors, such as fuel infrastructure, government regulations, and cost.

Characterizing the output of the reformer and the SOFC stack are indicators of how well the overall SOFC system is performing. It is important to know the constituents and their proportions in the gas streams entering and exiting the SOFC stack. These gas streams are located in a high temperature environment (i.e., about 600° C. to 1,000° C.). Completing monitoring of the constituents and their proportions with conventional sensors is not feasible, since most sensors operate in environments with temperatures of less than 100° C., and with a gas stream temperature of less than 100° C.

SUMMARY

The drawbacks and disadvantages of the prior art are overcome by the solid oxide fuel cell process gas sampling.

A method for monitoring process gas of a solid oxide fuel cell system is disclosed. The method comprises directing a portion of process gas from a chamber of the solid oxide fuel cell system to a main plenum chamber. A portion of process gas is cooled to a measurable temperature and directed to a sensor for analyzing.

A method for monitoring reformate of a solid oxide fuel cell system is disclosed. The method comprises directing a portion of reformate from a chamber of the solid oxide fuel cell system to a main plenum chamber. A portion of reformate is cooled to a measurable temperature and directed to a sensor for analyzing. A signal is relayed from the sensor to a controller. The cooled portion of reformats is eliminated from the solid oxide fuel cell system.

A solid oxide fuel cell system is disclosed. The system comprises a chamber disposed around a solid oxide fuel cell stack and a waste energy recovery assembly. A means for diverting a portion of process gas contained within the chamber is in fluid communication with a means for cooling the diverted portion of process gas to a measurable temperature. The system also comprises a means for analyzing the cooled portion of process gas.

A solid oxide fuel cell system is disclosed. The system comprises a chamber disposed within the solid oxide fuel cell system. A means for diverting a portion of process gas contained within the chamber is in fluid communication with a means for cooling the diverted portion of process gas to a measurable temperature. The system also comprises a means for analyzing the cooled portion of process gas and a means for directing the cooled portion of process gas out of the solid oxide fuel cell system.

The above described and other features are exemplified by the following figures and detailed description.

BRIEF DESCRIPTION OF THE DRAWINGS

Referring now to the figure.

DETAILED DESCRIPTION

Figure 1:
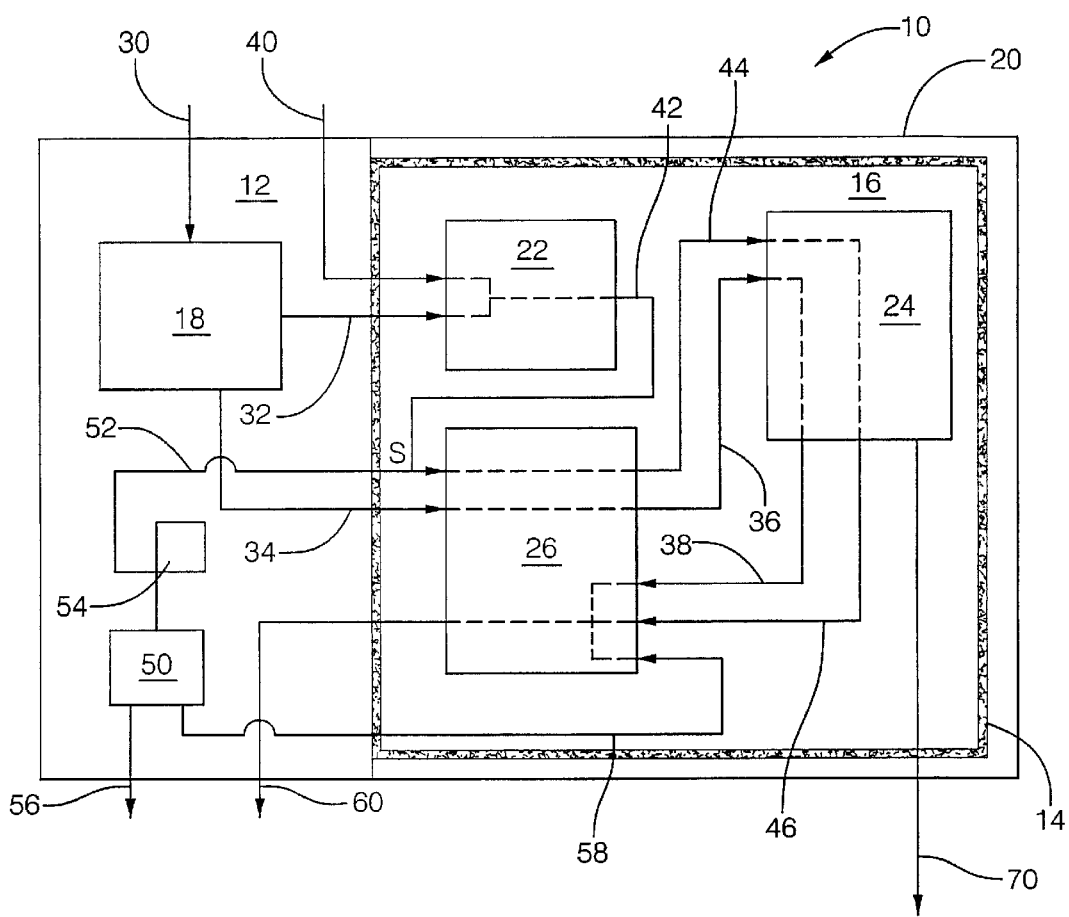
FIG. 1 is schematic of an exemplary system mechanization of a transportation industry SOFC system incorporating process gas analysis sampling.

Application of a SOFC in a transportation vehicle imposes specific temperature, volume, and mass requirements, as well as "real world" factors such as fuel infrastructure, government regulations, and cost to be a successful product. The SOFC power generation system can be designed to focus on the power output necessary to serve as an auxiliary power unit (APU) on-board and not as the prime energy source of the vehicle. The efficient operation of the SOFC system permits electrical power to be generated on-board a vehicle even when the primary internal combustion engine is not operating (which will be critical to "no-idle" emissions laws being enacted in global regions). The hydrocarbon-based fuel and atmospheric air are input into the system with electrical power, water vapor, carbon dioxide, and high-grade thermal energy as outputs. In order to determine whether the SOFC system is performing within appropriate ranges, the gas streams of the SOFC system should be monitored. This can be completed by directing a small sample of the gas stream from a stream with in the hot box chamber (e.g., the enclosure surrounding the SOFC stack, waste energy recovery assembly, and reformer) to the cooler environment of the process air section for sampling. The sampled gas can then be discharged via the waste energy recovery assembly.

Referring now to FIG. 1, a mechanization of a SOFC system is schematically depicted. The system enclosure 20 comprises a main plenum chamber 12, an insulation plenum chamber 14 and a hot box chamber 16. The main plenum chamber 12 can comprise the process air supply section 18 and the gas sensor 50. The hot box chamber 16 can comprise a SOFC stack 24, a reformer system 22, and a waste energy recovery (or heat exchanger) assembly 26.

A supply of air (or oxidant) 30, exterior to the system enclosure 20, provides air to the process air supply section 18 located within the main plenum chamber 12. The process air supply section 18 can optionally comprise a main blower (not shown) and air control valves (not shown). A supply of fuel 40, exterior to the system enclosure 20, provides fuel to the SOFC system 10. The fuel can optionally be provided via fuel injectors (not shown) located within the main plenum chamber 12. The supply of fuel 40 and a flow of air 32 can be directed to the reformer system 22. Distribution of the reformats 42 from the reformer system 22 can optionally be accomplished with a reformate control valve (not shown) controlled by an electrical actuator (not shown). All or a portion of the supply (or stream) of reformate 42 created in the reformer system 22 can be directed to the waste energy recovery assembly 26. Prior to entering the waste energy recovery assembly 26, a sample of the reformate stream can be directed via tubing 52 to the gas sensor 50 for monitoring. Another embodiment of monitoring the SOFC system 10 gas streams, includes collecting a sample from the anode exhaust stream 38, prior to entering the waste energy recovery assembly 26. Post-analysis, the samples can be directed via tubing 56, or through tubing 58, to the waste energy recovery assembly 26.

The waste energy recovery assembly 26 receives an anode supply (i.e., reformate) 42 and a cathode supply (i.e., oxidant) 34 that can be heated in the waste energy recovery assembly 26. The heated anode supply 44 and cathode supply 36 are then directed to the SOFC stack 24. To aid in heating the anode supply 42 and cathode supply 34, the waste energy recovery assembly 26 recovers the heated anode exhaust 38 and cathode exhaust 46 from the fuel cell stack 24. A flow of reaction byproducts (e.g., water, carbon dioxide, etc.) 60 can be discharged from the waste energy recovery assembly 26 to the exterior environment.

The SOFC stack 24 can be a multilayer ceramic/metal composite structure design to produce electricity 70 at an operating temperature of about 600° C. to about 1,000° C., with about 700° C. to about 900° C. preferred. It can comprise one or more multi-cell modules that are mounted to a common gas distribution manifold. Each module of the SOFC stack 24 produces a specific voltage that is a function of the number of cells in the module. Electrical attachment of the SOFC stack 24 is accomplished by way of electrodes that lead out of the hot box chamber 16 and system enclosure 20 to the vehicle power bus and system (not shown). The output voltage and current is controlled by the combination of these modules in series and parallel electrical connection, the air/fuel control system, and the electric load applied to the fuel cell system 10.

To facilitate the reaction in the fuel cell, a direct supply of fuel, such as hydrogen, carbon monoxide, or methane, is preferred. However, concentrated supplies of these fuels are generally expensive and difficult to supply. Therefore, the specific fuel can be supplied by processing a more complex source of the fuel. The fuel utilized in the system is typically chosen based upon the application, expense, availability, and environmental issues relating to the fuel.

Possible sources of fuel include conventional fuels such as hydrocarbon fuels, including, but not limited to, liquid fuels, such as gasoline, diesel, ethanol, methanol, kerosene, and others; gaseous fuels, such as natural gas, propane, butane, and others; and alternative fuels, such as hydrogen, biofuels, dimethyl ether, and others; and synthetic fuels, such as synthetic fuels produced from methane, methanol, coal gasification or natural gas conversion to liquids, and combinations comprising at least one of the foregoing methods, and the like; and combinations comprising at least one of the foregoing fuels. The preferred fuel is typically based upon the power density of the engine, with lighter fuels (e.g., those that can be more readily vaporized and/or conventional fuels which are readily available to consumers) generally preferred.

The processing (or reforming) of hydrocarbon fuels, such as gasoline, can be completed to provide an immediate fuel source for rapid start up of the solid oxide fuel cell, as well as protecting the solid oxide fuel cell by removing impurities. Fuel reforming in a reformer system 22 (e.g., a main reformer and a micro-reformer) can be used to convert a hydrocarbon (such as gasoline) or an oxygenated fuel (such as methanol) into a reformate (e.g., hydrogen and carbon monoxide) and byproducts (e.g., carbon dioxide and water). Common approaches include steam reforming, partial oxidation, auto reforming, and the like, as well as combinations comprising at least one of the foregoing approaches.

The waste energy recovery assembly 26 is located within the hot box chamber 16 and serves to convert the unused chemical energy (e.g., reformate) and thermal energy (exothermic reaction heat from the SOFC stack 24) to input thermal energy for the fuel cell system 20 through the use of an integration of catalytic combustion zones and heat exchangers. Oxidant is supplied to the waste energy recovery assembly 26 from the process air supply section 18 in the main plenum chamber 12. The waste energy recovery assembly 26 can receive fuel from two sources during operation. During the early part of start-up, low-grade reformate from the reformer system 22 can be routed, with a supply of air, directly to the waste energy recovery assembly 26 catalytic combustor. During normal operation, reformate can be directed through the waste energy recovery assembly 26 heat exchangers to the SOFC stack 24. The output of the SOFC stack 24, anode exhaust 46 and cathode exhaust 38 can be routed back to the waste energy recovery assembly 26 catalytic combustor to be mixed and catalyzed. The catalytic combustion zone heats the integrated heat exchangers of the waste energy recovery assembly 26.

The waste energy recovery assembly 26 can be a series of connected thermal exchange structures (e.g., plates, tubes, and the like) having one or more openings (or manifold passages) that border the edge of the plates, for example, for the flow of oxidant, reformate, and/or exhaust gases. The total number of plates forming a waste energy recovery assembly 26 can range from two to several hundred, depending on space and weight restrictions, and the like.

The thermal management system of the fuel cell system 10 is designed to insulate the internal hardware and protect the exterior surface temperature. The thermal management system incorporates three pressurized and segmented chambers housed in the system enclosure 20. The system enclosure 20 serves as the "outer skin" of the axillary power unit, supports the internal components, and is preferably actively temperature controlled for specific operational temperature limits. The three chambers are the main plenum chamber 12, insulation plenum chamber 14, and hot box chamber 16. The system enclosure 20 houses the main plenum chamber 12 and the insulation plenum chamber 14. Internal to the insulation plenum chamber 14 can be the hot box chamber 16, which houses the SOFC stack modules 24, waste energy recovery assembly 26, optionally the fuel reformer system 22, and several optionally other high temperature components.

The process air system section 18 can comprise the electric powered blower fan that pressurizes the chambers (main plenum chamber 12, insulation plenum chamber 14, and hot box chamber 16) for process air, cooling, and purging of the SOFC system 10. The blower can draw air over the top horizontal face of the system enclosure 20. This air path can cool the top surface to temperatures of about 45° C. or less, which is within the limits for attachment to a vehicle. The pressurized air can be discharged into the main plenum chamber 12 and metered through a series of air control valves.

In order to monitor the performance of the SOFC system 10, samples of the gas streams are collected and analyzed. However, because the environment within the hot box chamber 16 experiences high temperatures (e.g., of about 600° C. to about 1,000° C.), the gas sample is preferably directed out of the hot box chamber 16 to be analyzed.

As illustrated in FIG. 1, a gas sensor is located within the main plenum chamber 12 of the SOFC system 10. Collection of a sample from a gas stream within the hot box chamber 16 can be completed at several locations, although only sampling location S is illustrated. Tubing 52 directs the sample through at least one loop (although a series of loops is preferred) as illustrated by numeral 54, for cooling prior to entering the gas sensor 50 for analysis. Post-analysis the sample can be directed out of the SOFC system 10 via tubing 56 or be directed through tubing 58 to the waste energy recovery assembly 26 for further processing prior to discharge via the flow of reaction byproducts 60.

Due to the high temperatures, the gas sensor 50 is preferably positioned within the main plenum chamber 12 of the SOFC system 10, since the temperature within the main plenum chamber 12 can be less than about 100° C. In the alternative, the gas sensor 50 can be positioned external to the system enclosure 20. The gas sensor 50 can be any gas sensor capable of determining (or recognizing) specific compounds and preferably their concentrations.

The gas sensor 50 analyzes the collected sample from the gas streams (or process gas), flowing within the hot box chamber 16, to determine the constituents or compounds being generated and their proportions. The gas sensor 50 can be any sensor configured to test for any constituents or compounds being directed to, or from, the SOFC stack, including hydrogen, methane, carbon monoxide, carbon dioxide, water, and the like. For example, the gas sample for location S can be collected following the reformer system 22. The concentrations of reformate constituents will provide an indication of how the reformer system 22 is performing. Alternatively, a sample can be collected from the anode exhaust stream. In this case, the gas sensor 50 would measure concentrations of the anode exhaust stream and potentially compare them to the reformate stream in order to provide an indication of how the SOFC stack 24 is performing. A sample could also be collected from the waste energy recovery assembly exhaust 60 (or system exhaust) to monitor emissions performance.

After measuring the sample, a signal is generated in the sensor 50 and relayed to a controller. After processing the signal from the sensor 50, the controller can operably communicate with the appropriate system component to adjust the operation of the SOFC system 10. The sample can be directed outside the hot box chamber 16 with tubing 56. Likewise, tubing 58 can direct the sample, post-analysis, back into the hot box chamber 16 to the waste energy recovery assembly 26. Preferably, the sample, post-analysis, is directed to the waste energy recovery assembly 26, or for another appropriate device, for catalytic after treatment, and/or combustion prior to release to the exterior of the SOFC system 10. The tubing 52, 58 can be any material capable of withstanding the high temperature environment, including nickel, ferrous materials, such as stainless steel, and the like, and alloys and combinations comprising at least one of the foregoing materials. Tubing 56 can direct the sample, post-analysis, directly to the exterior of the SOFC system 10. However, unlike tubing 52 and 58, tubing 56 can also comprise any lower temperature (e.g., about 100° C. or less) materials, including steel, aluminum, copper, and the like, and alloys and combinations comprising at least one of the foregoing materials. The sample is collected within the hot box chamber 16, which is operating at high temperatures. The sample is preferably cooled prior to entering the gas sensor 50 The tubing 52 is located within both the hot box chamber 16 and the main plenum chamber 12, therefore experiencing a change in temperature from greater than about 600° C. (when operating) in the hot box chamber 16 to a temperature of less than about 100° C. in the main plenum chamber 12. As the sample travels from the hot box chamber 16 through tubing 52 to the main plenum chamber 12, the sample cools. This cooling can be achieved by directing the sample through tubing 52 within the cooler main plenum chamber 12 and through at least one loop, as illustrated by numeral 54, which allows the sample to transfer thermal energy to the main plenum chamber 12, thereby cooling the sample to a temperature of about 100° C. or less. The number of loops utilized should allow for sufficient cooling of the sample to a suitable (or measurable) temperature for the gas sensor 50 (e.g., less than about 100° C.). Alternatively, the sample can be directed through tubing 52 to a device capable of transferring thermal energy, such as a heat exchanger, and the like, prior to entering the gas sensor 50.

The pressurized gases flow through the SOFC system 10 from the highest pressure created in the process air system 18 to the lowest pressure in the waste energy recovery assembly 26. Because of this design, there is ample pressure to collect the sample without requiring an additional pump to transport the sample.

Monitoring of the gases of the SOFC system is simplified by using sensors, e.g., conventional sensor(s), located exterior to the hot box chamber, thereby reducing costs. Further, this design is also cost effective since it does not require an additional pump, and since the cooling effect of the coiled tube decreases the temperature of the sample allowing for effective analysis by the gas sensor without a separate heat exchanger.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A solid oxide fuel cell system, comprising:

a chamber disposed around a fuel cell stack and a waste energy recovery assembly; a means for diverting a portion of process gas contained within said chamber in fluid communication with a means for cooling said diverted portion of process gas to a measurable temperature; and a means for analyzing said cooled portion of process gas.

2. The solid oxide fuel cell system of claim 1, wherein said portion of process gas is selected from the group consisting of reformate, anode exhaust, system exhaust, and combinations comprising at least one of the foregoing process gases.

3. The solid oxide fuel cell system of claim 1, wherein said means for analyzing is a sensor operating in an environment having a temperature of about 100° C. or less.

4. The solid oxide fuel cell system of claim 3, wherein said environment is within a system enclosure, said system enclosure is disposed around said chamber.

5. The solid oxide fuel cell system of claim 1, wherein said measurable temperature is about 100° C. or less.

6. The solid oxide fuel cell system of claim 1, wherein said means for diverting is a tubing.

7. The solid oxide fuel cell system of claim 6, wherein said means for cooling comprises at least one loop of said tubing.

8. The solid oxide fuel cell system of claim 1, wherein said means for cooling comprises a heat exchanger.

9. The solid oxide fuel cell system of claim 1, further comprising a means for directing said cooled portion of process gas from said solid oxide fuel cell system.

10. A solid oxide fuel cell system, comprising:

a chamber disposed within said solid oxide fuel cell system;

a means for diverting a portion of process gas contained within said chamber in fluid communication with a means for cooling said diverted portion of process gas to a measurable temperature;

a means for analyzing said cooled portion of process gas;

a means for receiving a signal from said means for analyzing; and a means for directing said cooled portion of process gas out of said solid oxide fuel cell system.

11. The solid oxide fuel cell system of claim 10, wherein said portion of process gas is selected from the group consisting of reformate, anode exhaust, system exhaust, and combinations comprising at least one of the foregoing process gases.

12. The solid oxide fuel cell system of claim 10, wherein said means for analyzing is a sensor operating in an environment having a temperature of about 100° C. or less.

13. The solid oxide fuel cell system of claim 12, wherein said environment is within a system enclosure, said system enclosure is disposed around said chamber.

14. The solid oxide fuel cell system of claim 10, wherein said measurable temperature is about 100° C. or less.

15. The solid oxide fuel cell system of claim 10, wherein said means for diverting is a tubing.

16. The solid oxide fuel cell system of claim 10, wherein said means for cooling comprises at least one loop of said tubing.

17. The solid oxide fuel cell system of claim 10, wherein said means for cooling is a heat exchanger.

* * * * *